United States Patent [19]

Balboni

[11] 3,862,339

[45] Jan. 21, 1975

[54] PROCESS FSR MAKING RECTILINEAR BREAD LOAVES

[75] Inventor: John J. Balboni, Tarrytown, N.Y.

[73] Assignee: General Foods Corporation, White Plains, N.Y.

[22] Filed: Dec. 11, 1972

[21] Appl. No.: 313,720

[52] U.S. Cl................................. 426/19, 426/27
[51] Int. Cl............................................. A21d 8/06
[58] Field of Search............................... 426/27, 19

[56] References Cited
UNITED STATES PATENTS
2,061,149   11/1936   Garrett ............................ 426/27 X Primary Examiner—James R. Hoffman
Attorney, Agent, or Firm—Bruno P. Struzzi; Thomas V. Sullivan; Michael J. Quillinan

[57] ABSTRACT

A semi-proofed bakery bread dough is deposited in a convex-walled essentially square baking pan also having a convex bottom and top of geometry such that after baking the cooked loaf has straight, angularly-related sides within close dimensional tolerances.

4 Claims, 5 Drawing Figures

PROCESS FSR MAKING RECTILINEAR BREAD LOAVES

INTRODUCTION

This invention relates to a process for the baking of a bread dough and the panning of that dough so as to assure a predictable straight-sided shape.

BACKGROUND OF THE INVENTION

The prior art has employed convexed Pullman-pan ends and side walls for stronger pan strength; the top cover panel has also been convexed to prevent sway-back crusts. The bottom of the baking pan is customarily flat. A bread dough in Pullman-type bakery pan having such a geometry will produce a loaf which is not misshappen or shrunken but on the other hand one which does not have a conformation that is essentially square or retilinear upon cooling. These and other factors of design are described in the ECKO Bakery Engineering Review Volume 11 No. 1, Spring 1972. Customarily, as is indicated in this article, convexing is also relied upon to solve the "problem" of shrinkage during cooling of the baked goods: by bowing the pan sidewall surface outward slightly to the right depth and curvature, the resulting loaf of bread generally has straighter or flatter ends, sides and bottoms and crusts that don't sag. However, such breads do not have as close and consistent a tolerance for certain manufacturing requirements as would be desired.

To explain, in the manufacture of a composite sandwich product wherein two bread slices sandwich a filling, mechanical means are used to advance or manipulate the bread slice from one station to the next in the compositing process to produce the ultimate sandwich. This requires that each consecutive bread slice per se be of uniform shape, dimension and texture for registry with mechanical means to controllably advance the bread from one station to the next; importantly the slice should be rigid enough to respond consistently to the manipulation that the slice undergoes in sandwiching operation. The prior bread making art, so far as is presently known, does not meet the requirements for such mechanical sandwich-making operations, perticularly ones calling for high speed.

STATEMENT OF THE INVENTION

In accordance with the present invention, a yeast-leavened bread dough is proofed to an intermediate degree hereinafter referred to as semi-proofing, as a result of which the ultimate loaf is of a high density and rigidity when sliced. The degree of proofing is a matter within the skill of the baker; if suffices to state that the bread dough is proofed less than its optimal proofing capacity, which semi-proofing is accomplished by using a substantially larger amount of dough for a given pan volume than would be used for the proofing step; also, the total elapsed time in the pan during the proofing operation will be substantially less than is customary for that amount of dough in a given pan.

The semi-proofed dough is then baked in a pan having certain geometric modifications, the specifications and functions of which are as follows:

1. Longitudinal side pan walls have a very slight upward and outward taper to permit de-panning and are bowed convexly intermediate the upper and lower extremities; the side pan walls each form the locus of a plane having an acute angle less than 2.5 but more than 1.5 relative to a vertical plane intersecting same; the function of this specific side panel taper and bowing is to produce a slightly bowed sidewall in the baked loaf which upon de-panning and cooling shrinks to an essentially straight-sided rigid crust;

2. A convex top panel is similarly geometrically surfaced relative to the side pan walls in terms of the bowed structure thereof so that the baked bread when de-panned will similarly shrink to a straight-sided essentially rigid crust.

The Pullman-type baking pan, together with one hood or cover pan not only prevent sway-back crusts but function coordinately with the pan ridge and bottom to assure that the crust of the top of the loaf will likewise shrink uniformly to a geometric square or other rectilinear pattern as design may dictate preferably a square, so as to permit simplicity in sandwiching operations. Whereas the prior art used a Pullman-type pan to provide a rigid bakery product, such art has not so far as is presently known identified a pan structure which is capable of de-panning into a baked bread of satisfactory crust rigidity which when it does cool shrinks to a consistent square within close dimensional tolerances; indeed it is a feature of the present invention that the bread cools into an essentially straight-sided loaf.

Baking of a semi-proofed dough in a pan of the aforestated structure provides a bread of substantially increased density relative to conventional yeast-leavened bread of commerce and by reason of the rectilinear cross section and rigidity offered by this bread it can be consistently sliced to a thinness which is uncommon to the bread slicing art and advantageously lends itself to sandwich making operations; thus, bread slices of the present loaf resist distortion in such mechanical sandwich making stations as would otherwise depress, flex or bend the slice.

It should be noted that the pan has a sidewall taper which is significantly less than what men skilled in the art of convexing and bread pan manufacture would consider good manufacturing practice to assure de-panning ease; the pans are of such taper that they do not lend themselves to stacking or nesting.

Generally the bowed sidewall portion of the pan structure will have an arc angle of 5°–15°, and will be bowed such that the distance between the chord and the arc will be between three sixteenths and five sixteenths of an inch at the midpoint of the arc. The baked goods upon emergence from the baking oven will initially occupy the pan volume fully; after de-panning the baked bread will be essentially rectilinear in cross-section with the crust panels being of an arc radius corresponding to that of the bowed section of the pan's side walls. The side wall taper will be just slight enough relative to the vertical plane, to permit de-panning. By virtue of the density of the baked goods stemming from the semi-proofed condition of the dough before baking and the consequent loaf density, the de-panning operation will be facilitated; the increase in loaf density thus assures the "throw" in de-panning will achieve release from the modified Pullman pan of the present invention.

DETAILED DESCRIPTION OF THE INVENTION

The bread dough will essentially be formulated from flour, sugar, non-fat milk solids, yeast, yeast food, salt, shortening, and optional enrichment agents or tablets.

This basic formulation (less a portion of the flour) is mixed with water and agitated in a suitable mixing tank with violent agitation sufficiently to hydrate the flour. The hydrated mix is then held for a period of time in the neighborhood of two hours to occasion broth fermentation with slow agitation; agitation is prolonged sufficiently to substantially spend the yeast energy but leave a residual yeast leavening effectiveness; a later addition of a yeast-sugar "spike" supplements ultimate bake-leavening.

At this point to provide a semi-coarse baked bread texture a bromate tablet is added to the broth and it is intimately mixed with the balance of the flour and the shortening constituent is also metered in accordance with good bakery practice known to those skilled in the art, the shortening being a customary emulsified triglyceride of cottonseed or other vegetable origin preferably having mono- and diglycerides added thereto.

The dough is produced by mixing for a period of 1 to 3 minutes say in a continuous process starting from the point of initial mixing to the point of discharge; the dough will be sticky and plastic in the sense that it is depositable into the bakery pan specified herein along the length thereof which will be in the neighborhood of 12 to 18 inches.

The pan will have a depth of 3½ inches, a width of 4⅛ inches at the bottom and span 4⅜ inches at the top, the pan having a convex hood of top panel side and bottom panel; the ends are also convexed to a like geometry.

The essentially unproofed dough is "dropped" along the length of the pan to a height of three-fourths to 1½ inches whereafter the dough will be semi-proofed for a foreshortened period of approximately 45 minutes at a substantially 95% or more relative humidity employing a wet bulb temperature exceeding 95° but below 110°F. in a proofing cabinet; the leavened dough rises to approximately pan wall height less a fraction of an inch. The semi-proofed dough condition is such that it is capable of being further proofed and of achieving a larger volume increase with further proofing. Generally, the degree of proofing will be such at this point that were proofing to continue, the volume increase stemming therefrom would be substantially above 10% but a minor fraction of the volume of the dough in the semi-proofed state.

As a consequence of such semi-proofing, the eventual baked loaf will have an extraordinarily high density rendering it compatible with loaf slicing and slice-handling operations for mechanical sandwich making.

The semi-proofed dough will have the top convex cover placed thereon and fitting the free edge of the dough pan and the dough will then be baked. The baking operation is preferably carried out in a three zone Baker Parkins-like gas-fired oven. Whereas the bread may be baked in the traditional procedure of using three separate and elevating temperature zones it is preferred in accordance with this invention to carry out the baking operation at a relatively constant temperature since it has been found that the baked goods have a somewhat more uniform shape as a result. Typically, baking will be practiced at a temperature of 410°–475°F. and optimally at a temperature of 440°F. for a period of 20–30 minutes and mort preferably 25 minutes. The baked bread can then be removed from the oven, de-panned and cooled for 45 minutes to an hour at atmospheric temperature.

Upon cooling, the generally arced panels in rectilinear cross-section will shrink to define a relatively square-sided, firm crusted loaf having a density of 0.30 to 0.40 gms. per cubic inch; generally loaf density will be approximately twice that of conventional bread. The cooled loaf will be sliceable at thinnesses whereat conventional bread would not be consistently cuttable on machines available in the art — say to a thinness of 0.03 to 0.2 inches or even thinner.

The following is a specification of requirements for a best mode for making an enriched white bread:

An enriched white bread was produced by the continuous process described hereinabove employing the following formula:

| Ingredients | % by Weight | |
|---|---|---|
| Flour | 58.048 | |
| Water | 34.829 | |
| Sugar, Liquid | 1.747 | |
| Yeast, Bakers (Fleischmann's or equivalent) | 1.596 | |
| Bread Shortening, (Liquid or Solid) | 1.161 | |
| Milk, Nonfat Dry | 1.155 | |
| Salt | 1.074 | |
| Hydrated Monoglycerides (EZEE Slice or equivalent) | 0.145 | |
| Ammonium Sulfate | 0.087 | |
| Calcium Acid Phosphate | 0.075 | |
| Calcium Propionate (1) | 0.070 | |
| Vitamin Enrichment Wafers (2)* | 0.0116 | |
| Potassium Bromate (Bromatex) | 0 | .0005 |
| | 100.00 % | |
| *Thiamine HCL (Vit.$B_1$) | 190 mg. Minimum | |
| Riboflavin (Vit.$B_2$) | 90 mg. Minimum | |
| Niacin | 1200 mg. Minimum | |
| Iron (derived from ferric orthophosphate) | 900 mg. Minimum | |
| Starch and other inert excepients | Remainder | |

A bread baked in accordance with the foregoing process and employing the foregoing formula will produce a loaf approximately 4⅜ inches × 3½ inches × 15 inches having cave-ins no more than one-half inch on any wall when the bread loaf cools; it should be appreciated that some eccentricity in baking may occur but the vast majority of loaves have both minimal cave-ins on the top and side walls and minimal rounded ends. The "dough drop" to the pan for semi-proofing will be in the order of 33 oz. and upon baking the loaf can be sliced to a thinness of 0.210 inches and a weight of 8–10 gms. The bread slice will have a uniform open grain with little or no large open channels, lumps or streaks. The bread loaf exterior will be uniform even golden brown and the interior a uniform white. The bread can be held at room temperature for seven days; and, during warm weather, the calcium propionate level will be increased 50% in the formula. The loaf will be such as to resist distortion and the slices themselves will offer sufficient rigidity to be manipulated in a mechanical sandwich-making machine by mechanical means which exerts edgewise pressure on an individual bread slice.

Referring now to the accompanying drawings of a bakery pan and showing the pan with the semi-proofed dough and the baked loaf produced in accordance with the invention:

Figure 1:
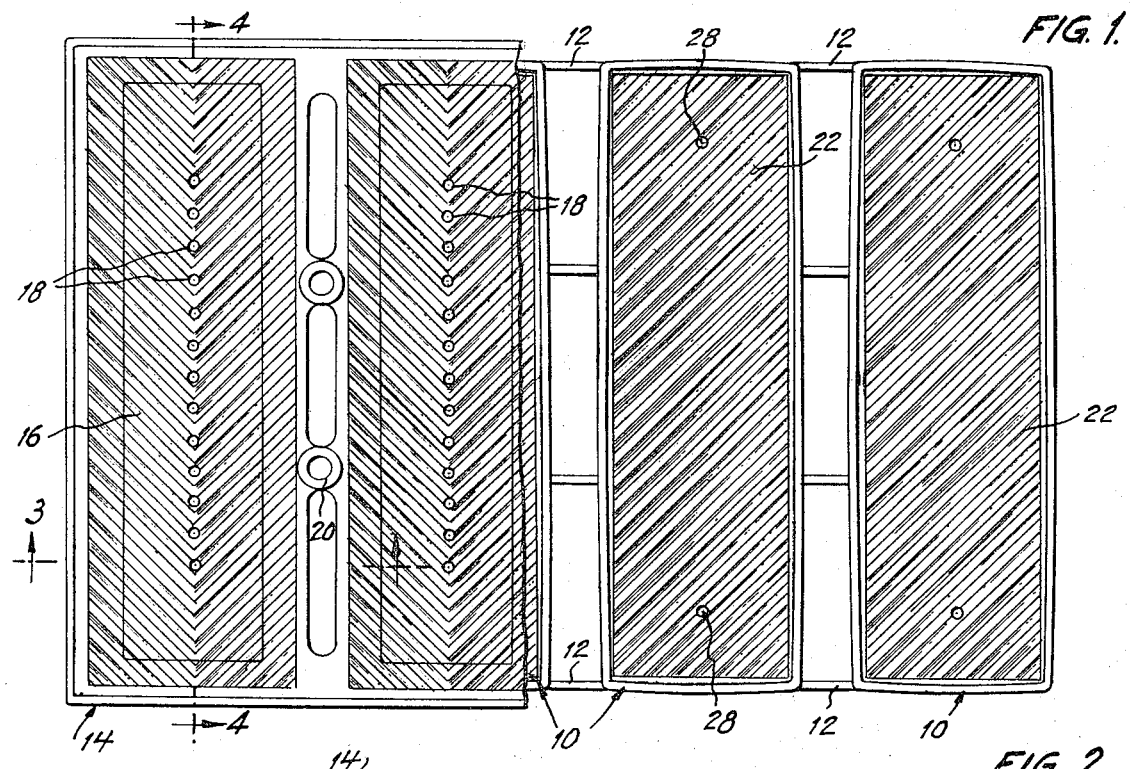
FIG. 1 is a top plan view of a multiple pan assembly with the pan empty and having portions of the cover broken away to reveal the individual pan interiors.
Figure 2:
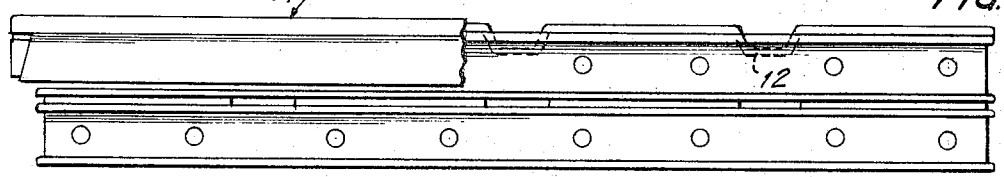
FIG. 2 is a side elevation of the pan assembly structure shown in FIG. 1.

Referring to FIGS. 1 and 2, a Pullman-pan assembly generally typical of prior art comprises a series of pans 10 fixedly connected to one another by brackets 12 to form a pan assembly. Overlying the assembled pans is a cover generally shown as 14 and adapted to overlie pan assembly 12. Cover 14 comprises a series of individual pan covers 16 vented at 18 and interconnected by joining interlocking flanges 20.

It will be noted that individual pan bottoms 22 and side walls 24, 26 are diagonally bias-corrugated as are the top panels of individual covers 16. Such corrugation serves to assure an even distribution of heat and promote a uniform baking to the rectilinear geometry provided by the covered pan during baking. Holes 18 formed in cover 16 serve to permit the evaporation of water vapor during baking.

Figure 3:
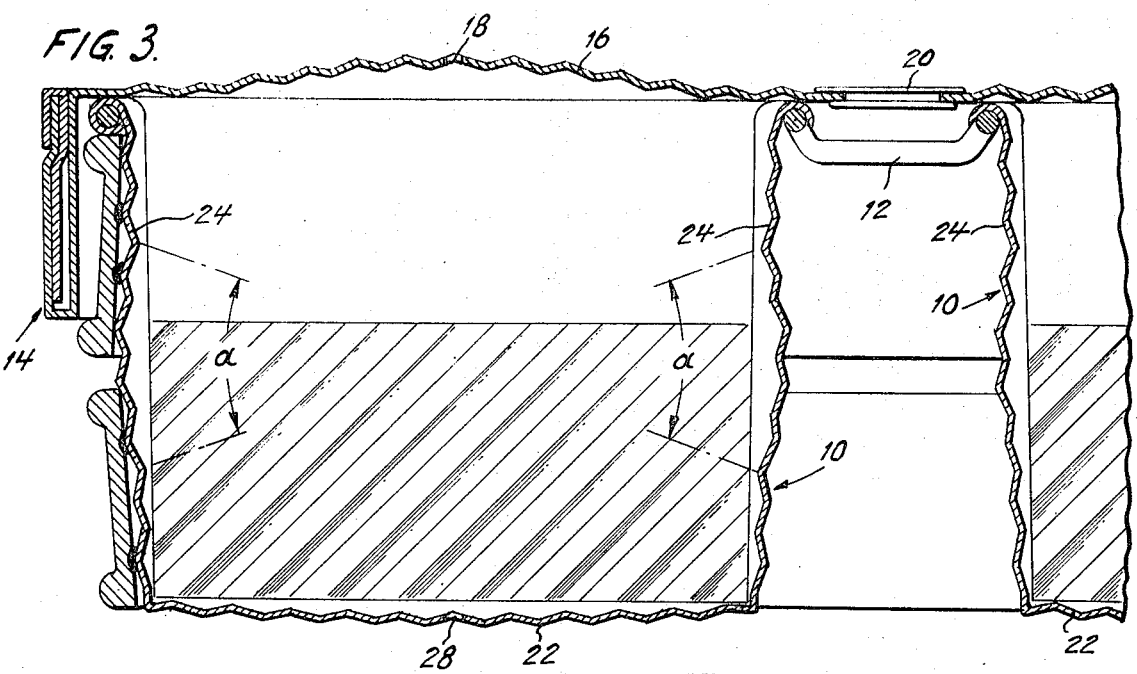
FIG. 3 is an expanded side elevation of the pan and cover of one of the pans taken along line 3—3 in FIG. 1.
Figure 4:
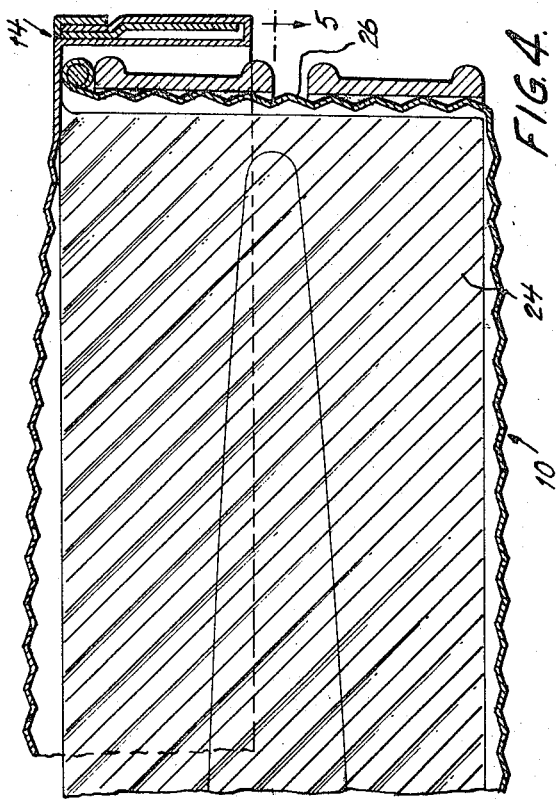
FIG. 4 is an enlarged sectional view like FIG. 3 taken along line 4—4 in FIG. 1.
Figure 5:
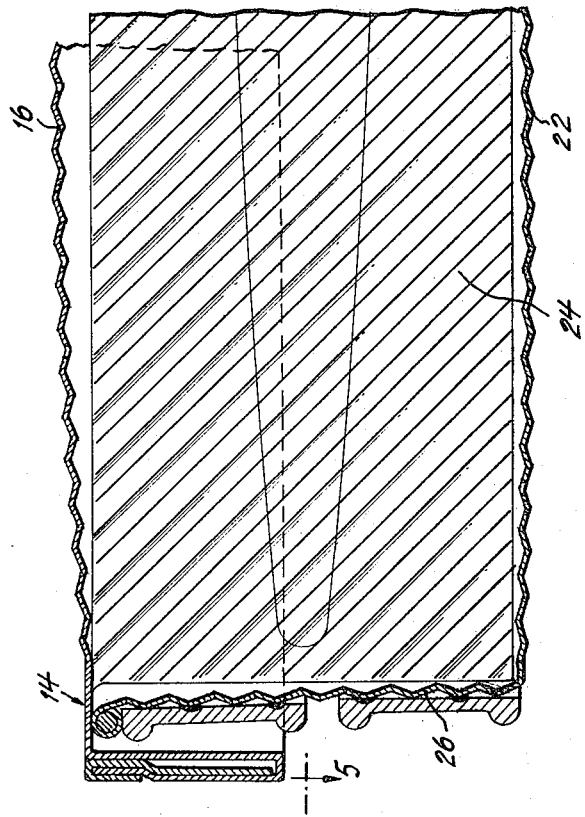
FIG. 5 is a sectional plan view in smaller scale taken along line 5—5 in FIG. 4.
Figure 5:
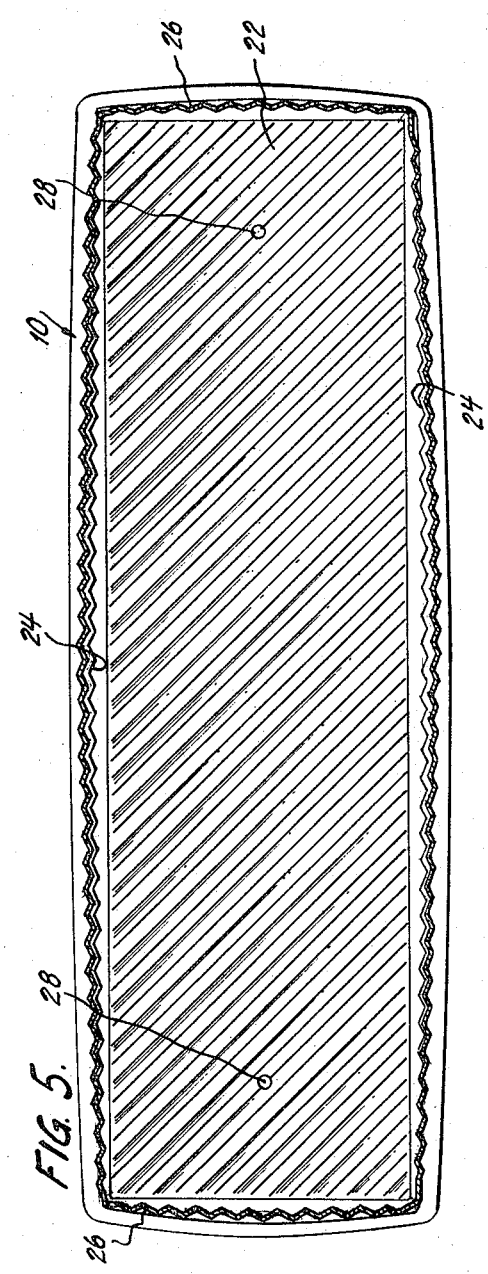

Referring to FIGS. 3-5, it will be noted that the side walls of individual pans are outwardly bowed as explained hereinabove to produce convex baked hot loaf side crust panels which shrink to cooled straight panels. For like purposes, pan bottoms 22 of individual pans are perforate as at 28 to permit escape of gases upon proofing and thereby assure the intended convex crust bottom panel in the baked hot loaf which shrinks to the ultimate straight sided crust panel.

Thus, there is a generally convex bowing of side wall panels 24 and 26 as well as bottom panels 22 and top cover 16 which may be characterized as generally convex.

Critical to the present invention and a distinct feature thereof will be the slight upward and outward taper of the side pan walls 24 and 26 which forms a very acute angle in the neighborhood of 2° relative to a vertical plane shown in FIG. 3 intersecting an imaginary plane of the pan wall intersecting the upper and lower extremities of the respective walls 24 and 26. More particularly referring to individual pan walls 24 and 26 it will also be noted that the intermediate portion thereof is bowed slightly outward to define an arc say of about 5°-15° designated as alfa, the arc being defined by the ridges of the individual corrugations in cross-section as shown if FIG. 3 and each respectively centering about a point located in the approximate midheight of the pan as shown in FIG. 3.

The foregoing pan structure assumes a more or less oblong, rounded crust panel as the hot loaf is depanned which panels will shrink to the desired rectilinear planar surface for a square or rectangular loaf.

Having now fully described the best mode of composition, preparation, baking and pan construction for practicing this invention, it should be interpreted for its spirit by reference to the accompanying claims.

What is claimed is:

1. Process for baking bread which comprises semi-proofing a yeast-raised aqueous bread dough in a bakery pan whose side walls have an upward and outward taper and are bowed convexly intermediate their upper and lower extremities and whose sides form the locus of a plane having an acute angle less than 2.5° but more than 1.5° relative to a vertical plane intersecting same, baking the dough and de-panning it, the de-panned hot loaf being of a rectilinear cross-section whose crust panels have an arc radius corresponding to that of the bowed section of the pan's side walls, the semi-proofed condition being such that but for termination of the proofing step a volume increase above about 10% but less than 50% of the semi-proofed dough volume would be achieved if proofing were allowed to continue, and cooling the loaf under ambient conditions to allow it to shrink to a rigid crust having straight sides.

2. The process of claim 1 wherein the bowed side wall structure of the pan has an arc angle of 5°-15° and is bowed so that the distance between the chord and the arc is between three-sixteenths inch and five-sixteenths inch at the mid-point of the arc.

3. The method of baking a bread dough adapted to be sliced and produce essentially rectilinear slices which comprises formulating a bread dough composed of water, flour, sugar, non-fat milk solids, yeast, leavening and shortening, mixing the dough to hydrate the flour and produce broth fermentation, the period of agitation being prolonged sufficiently to spend all but a residual amount of yeast-leavening effectiveness, intimately mixing a portion of flour and hydrated shortening with the fermented dough to produce a sticky plastic mass, dropping the dough into and along the length of a baking pan whose side walls have an upward and outward taper and are bowed convexly intermediate their upper and lower extremities and whose sides form the locus of a plane having an acute angle less than 2.5° but more than 1.5° relative to a vertical plane intersecting same, the pan having the side walls thereof bowed convexly intermediate their upper and lower extremities in an arc angle of 5°-15° wherein the distance between the arc chord and the arc is between three-sixteenths inch and five-sixteenths inch at the arc midpoint, proofing the dropped dough for a period insufficient to fully proof the dough but sufficient to cause it to expand and thus be semi-proofed, the dough condition being such that by the termination of the proofing step a volume increase above about 10% but less than 50% of the original semi-proofed dough volume would be achieved if proofing were allowed to continue, baking the semi-proofed dough in said pan, de-panning the baked loaf, said de-panned loaf being rectilinear in cross section and having arced crust sections corresponding to the arc radius of the pan's side walls, and allowing the de-panned loaf to cool to a straight-sided rectilinear bread.

4. The method of claim 3 wherein the dough is semi-proofed at a relative humidity of at least 95% while at a wet bulb temperature exceeding 95° but below 110°F. in a proofing cabinet.

* * * * *